United States Patent [19]
Haire

[11] Patent Number: 5,934,849
[45] Date of Patent: Aug. 10, 1999

[54] ANCHORING SYSTEMS FOR VEHICLE BODIES

[75] Inventor: Andrew Ralph Haire, Thomasville, N.C.

[73] Assignee: A. Ralph Haire, Thomasville, N.C.

[21] Appl. No.: 08/829,651

[22] Filed: Mar. 31, 1997

[51] Int. Cl.⁶ ........................................... B60P 7/08
[52] U.S. Cl. ..................... 410/113; 410/96; 410/101; 410/104; 410/112; 410/116; 410/117
[58] Field of Search ................. 410/117, 96, 97, 410/101, 102, 104, 105, 8, 10, 11, 115, 116, 112, 113; 248/499; 24/265 CD, 302, 580, 693, 609

[56] References Cited

U.S. PATENT DOCUMENTS

| | | | |
|---|---|---|---|
| 2,605,721 | 8/1952 | Johnson et al. ........................ | 410/112 |
| 2,660,130 | 11/1953 | Johnson ................................ | 410/112 |
| 3,478,995 | 11/1969 | Lautzenhiser et al. . | |
| 3,804,436 | 4/1974 | Ehrlich . | |
| 3,831,976 | 8/1974 | Iden, Sr. . | |
| 3,842,755 | 10/1974 | Carr ....................................... | 410/113 |
| 3,877,671 | 4/1975 | Underwood et al. . | |
| 3,958,516 | 5/1976 | Cheung ................................. | 410/115 |
| 3,972,500 | 8/1976 | Johnson et al. . | |
| 3,996,861 | 12/1976 | Santho . | |
| 4,062,297 | 12/1977 | Snyder et al. . | |
| 4,954,031 | 9/1990 | Geeck, III ............................. | 410/110 |
| 5,139,375 | 8/1992 | Franchuk ............................. | 410/105 |
| 5,700,118 | 12/1997 | Bennett et al. ...................... | 410/113 |

FOREIGN PATENT DOCUMENTS

| | | | |
|---|---|---|---|
| 749598 | 1/1967 | Canada ............................ | 24/265 CD |
| 2167354 | 5/1986 | United Kingdom .................. | 410/113 |

*Primary Examiner*—Stephen T. Gordon
*Attorney, Agent, or Firm*—Alston & Bird LLP

[57] ABSTRACT

Anchoring systems include a panel having a surface and a channel recessed from the surface and a tracking plate having a spine connected with the panel in the channel. The anchoring systems further include receiving units for receiving a cargo anchoring mechanism. The tracking plate preferably further includes a face member connected with the spine member such that a portion of the spine member and the face member are spaced apart to define a cavity. The tracking plate is preferably adhered with the panel having the spine connected in the channel and the face member adhered with and coextensively overlying the inner surface of the panel. Further, the receiving units, preferably apertures of the tracking plate, can be aligned with a cavity formed between the face member and the spine member.

2 Claims, 3 Drawing Sheets

ANCHORING SYSTEMS FOR VEHICLE BODIES

FIELD OF THE INVENTION

The invention relates generally to cargo anchoring systems for vehicle bodies.

BACKGROUND OF THE INVENTION

Vehicles of various types have been provided with vehicle bodies having cargo and personnel carrying spaces which incorporate various restraining systems. Some of these cargo restraining or anchoring systems have been designed for particular types of vehicle bodies.

Several types of vehicle bodies, including bodies used in trucks, have been constructed for various cargo and personnel carrying purposes. One type of vehicle body has utilized a sheet and post construction having a skeletal frame of aluminum support posts and aluminum sheet panels connected between the posts. In certain designs of these sheet and post vehicle bodies, plywood sheets have been inserted in the interior of the vehicle body behind the metal skeletal frame. Another type of vehicle body has been constructed utilizing panels made of wood, plywood, or fiberglass reinforced materials including fiberglass reinforced plywood (FRP) and fiberglass reinforced polymers or plastics. Such fiberglass reinforced panels generally include a pair of fiberglass layers sandwiching a layer of plywood or polymer material such as polyester.

Cargo anchoring systems generally have been connected with these vehicle bodies in the cargo carrying spaces by nails, screws, bolts or other fasteners connected and extending through holes drilled through the thickness of the panels. These anchoring systems have typically included a skeletal frame connected to the panels of the sheet metal or panelled vehicle body by such fasteners extending through the vehicle body panels. The fasteners generally extend through the entire thickness of the panel and protrude to the outside of the vehicle body.

One anchoring system which has been used with such vehicle body types includes a series of vertical, Z-post skeletal frames which can be fastened or connected into and through the panels of the vehicle body. An anchoring plate can be secured to the Z-post skeleton frame and extended across the Z-post skeleton frame. The anchoring plate extends from the inner surface of the vehicle body panel into the interior of the vehicle body a distance up to several inches. These anchoring plates generally extend into the interior of the vehicle body to provide space for connecting a vehicle anchoring mechanism with the anchoring plate between the anchoring plate and the vehicle panel. Cargo straps with buckles and other anchoring mechanisms have been utilized with these tracking systems in the cargo carrying space to secure cargo. Use of these Z-post tracking systems for cargo restraint thereby reduces the cargo carrying capacity in the vehicle body on each side wall, and anywhere else that such anchoring systems are connected. Other panel trucks have also had tracking plates screwed directly to the panels with associated problems described herein.

Further, these skeleton frame anchoring systems generally require a wooden scuff plate which is attached to the bottom of the side walls and extends about two inches into the cargo carrying space. The scuff plate is generally necessary to protect the Z-post anchoring systems from damage by cargo during operation. These scuff plates also can reduce available cargo space in such trucks.

Various fasteners, for example buttonhead nuts, positioned on the outer surface of the vehicle body have secured such screws, bolts and fasteners. Advertising in various forms, including company or product names or logo's and product illustrations, can cover the outer surface of such trucks. This advertising can be hindered or interrupted by the fasteners positioned on the outer surface of the truck.

Vehicle bodies having such anchoring systems can also experience water seepage and damage and heat loss due to the presence of such fasteners secured through the panels as well as problems such as rust, shear and other failures of the fasteners. More specifically, under various conditions of operation, these truck bodies can experience high temperatures of 150–165 degrees Fahrenheit within the cargo carrying space. Under such extreme temperature conditions, these truck bodies experience tremendous sweating and condensation whereby moisture can enter the panels through the holes and cause rotting and other damage to the panels. Rain, snow and other moisture from the environment can also enter the holes caused by the fasteners from the outside and damage and decay the panels. The screws and bolts which protrude through the panel to the outside of the panel create an avenue for heat loss, whereby heat transfer occurs through the screws or bolts. This is especially a problem in the trucks having refrigerated truck bodies or climate controlled environments.

Therefore, there is a need for an anchoring system for use with a vehicle body which can provide a flexible anchoring system for truck bodies, including panelled truck bodies, which reduces lost cargo carrying capacity due to the anchoring system. Further, there is a need for a cargo anchoring system for use with a vehicle body which can reduce water seepage and decay in vehicle body panels and can reduce heat loss through the panels and fasteners. Also, there is a need for a flexible anchoring system which can be placed at various locations in a vehicle body. Still further, there is a need for an anchoring system for a vehicle body which can facilitate the display of advertising on the outside of a vehicle body.

SUMMARY OF THE INVENTION

In view of the above limitations of existing cargo and personnel anchoring systems for vehicle bodies, it is an object of the present invention to provide logistical tracking or anchoring systems for vehicle bodies and related methods which can be connected in the vehicle body in a variety of locations.

Another object of the present invention is to provide anchoring systems for vehicle bodies which reduce the water seepage and associated decay of vehicle body panels and reduce heat loss through the panels.

A further object of the present invention is to provide anchoring systems which increase the available cargo space within the interior of the vehicle body.

It is a still further object of the present invention to provide anchoring systems for a vehicle body which can enhance the use of the vehicle body for advertising.

These and other objects in the invention are satisfied by the anchoring systems for a vehicle body of the present invention which enable the user to anchor cargo or personnel at various locations in the vehicle body without significantly reducing cargo carrying space. The anchoring systems include a panel and a tracking plate. The panel has a channel recessed from one surface thereof. The tracking plate has a spine which resides within and is connected with the panel channel. The anchoring systems further include receiving means (preferably a plurality of apertures in the tracking plate aligned with the spine) for receiving a cargo anchoring mechanism. In this configuration, the anchoring system can increase available cargo space, reduce heat loss through panels and water damage in vehicle body panels, enhance advertising uses of the exterior of the vehicle bodies and provide an integrated, anchoring system for cargo and/or personnel in various vehicle bodies. In the anchoring system, the tracking plate preferably further includes a face member connected with the spine member such that a portion of the spine member and the face member are spaced apart to define a cavity. The face member of the tracking plate preferably extends laterally beyond the channel of the panel. The tracking plate is preferably adhered with the panel having the spine connected in the channel and the face member adhered with and coextensively overlying the inner surface of the panel. The tracking plate also preferably includes a plurality of holes such that the tracking plate can be adhered with the panel by adhesive rivets in the holes.

Vehicle bodies can be constructed that include anchoring systems utilizing panels with tracking plates as described herein. Vehicle bodies having such anchoring systems can be constructed by adhering a tracking plate with the panel, preferably such that spine member of the tracking plate and a portion of the cavity of the tracking plate are positioned in the panel channel. Vehicle bodies can likewise be constructed having a plurality of tracking plates adhered to one or more panels as described. Vehicle bodies can employ such panels and tracking plates in the floor, the sidewalls, the front wall and/or the roof. Various vehicles including cargo and/or personnel carrying trucks can be constructed with such vehicle bodies having anchoring systems as described herein.

DETAILED DESCRIPTION OF THE DRAWINGS

The present invention will now be described more fully hereinafter with reference to the accompanying drawings, in which preferred embodiments of the present invention are shown. This invention may, however, be embodied in many forms and should not be construed as limited to the embodiments set forth herein; rather, these embodiments are provided so that this disclosure will be thorough and complete, and will fully convey the scope of the invention to those skilled in the art. Like reference numbers refer to like elements throughout.

Figure 1:
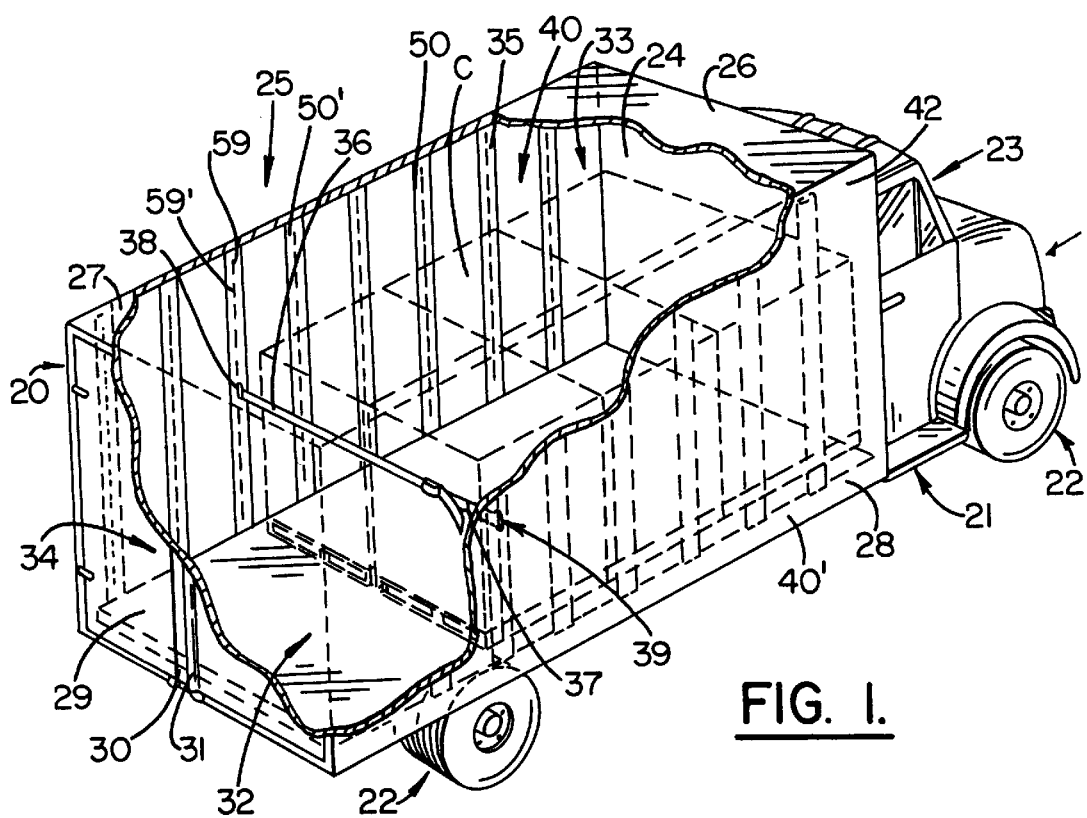
FIG. 1 is a cutaway perspective view of a vehicle having an anchoring system for the vehicle body according to the present invention.

Referring now to the figures, a truck 20 having a vehicle body 25 with an anchoring system 35 according to the present invention is depicted in FIG. 1. The anchoring system 35 includes panels 40, 40' and a plurality of tracking plates 50, 50'.

Referring still to FIG. 1, the truck 20 includes a frame 21, wheels 22 connected to and supporting the frame 21 and a cab 23. Such truck components are known to one of skilled in the art and are not described in detail herein.

Still referring to FIG. 1, the vehicle body 25 has a roof 26, a floor 29, sidewalls 27, 28, a front wall 24, and rear doors 30, 31. The rear doors 30, 31 are pivotally connected to respective sidewalls 27, 28 and provide access into a cargo carrying or personnel cavity or space 32 defined by the roof 26, sidewalls 27, 28, floor 29, front wall 24, and rear doors 30, 31. The truck 20 depicted in FIG. 1 is typically used to haul cargo, such as containers, boxed products or furniture.

Figure 2:
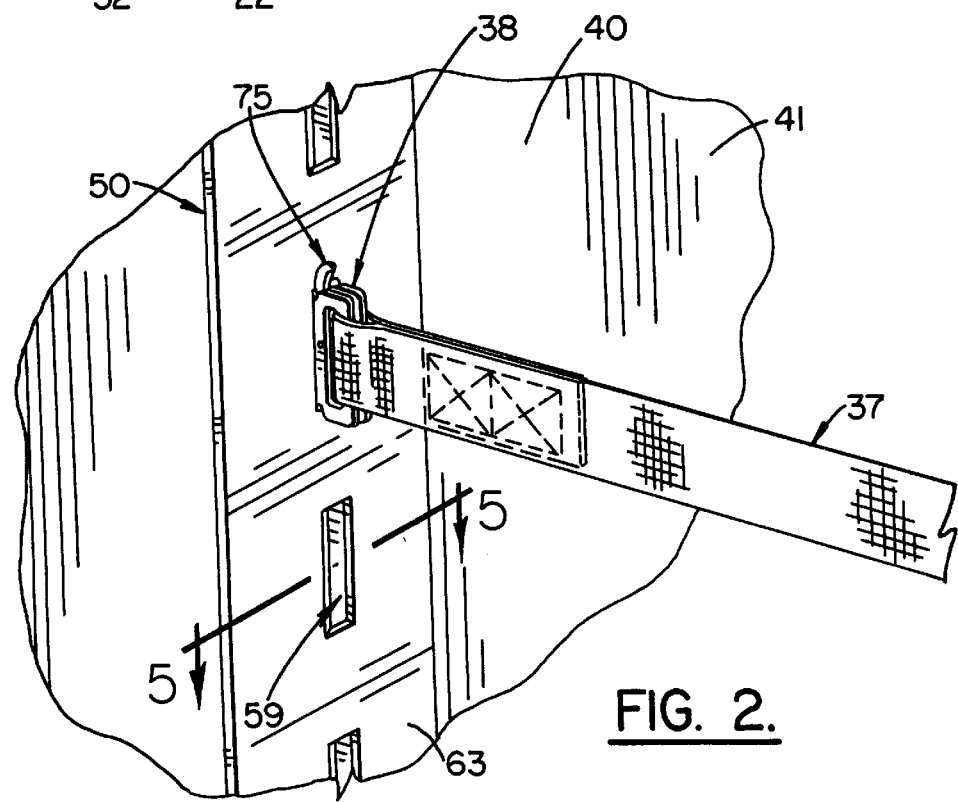
FIG. 2 is an enlarged partial view of the anchoring system of the vehicle as depicted in FIG. 1.

Referring now to FIGS. 1 and 2, the each of the sidewalls 27, 28 of the vehicle body 25 depicted in FIG. 1 is manufactured from a single panel 40, 40'. Each of the panels 40, 40' is identical, and for the sake of brevity, only a single panel 40 is described herein. The panel 40 is generally planar and is formed of a fiberglass reinforced plywood (FRP) material. Such panels 40 are known in the art and have been used for vehicle bodies including, freight vans, refrigerated moving vans, motor homes and recreational vehicles known commonly as "RVs". When used in manufacturing vehicle bodies, such FRP panels 40 can reduce dents, scuffs or damage that can be sustained by sheet metal trucks. The panel 40 shown in FIGS. 1–8 is available from suppliers such as the Coretex Company of Washington Courthouse, Ohio. Each sidewall 27, 28 also can be manufactured from a plurality of panels 40 connected with adjacent edges aligned and connected to form the sidewall.

Referring again to FIGS. 1 and 2, the anchoring system 35 includes a plurality of tracking plates 50, 50' connected with each panel 40, 40' of the sidewalls 27, 28. Each of the tracking plates 50, 50' are also identical, and for the sake of brevity, the tracking plates are discussed with reference to a single tracking plate 50. The tracking plate 50 extends vertically from the floor 29 to the roof 26 of the sidewall 27 of the vehicle body 25. The tracking plate 50 contains a plurality of apertures 59, 59'. The tracking plates 50, 50' are positioned about twenty-four (24) inches apart along the length of the sidewalls 27, 28. Cargo restraining mechanisms 36 can be connected in the plurality of apertures 59, 59' of the tracking plates 50, 50' at varying heights and positions to accommodate varying size and configurations of loads of cargo C. The anchoring system 35 can also include a single tracking plate connected with a panel.

Still referring to FIGS. 1 and 2, a cargo restraining mechanism 36 is connected with the anchoring system 35 and has a strap 34 having buckles 38, 39 at opposite ends thereof. Each buckle 38, 39 is connected to tracking plates 50 on opposite sidewalls 27, 28 to hold or retain cargo in a forward portion 33 of the vehicle body 25 forward of the cargo restraining mechanism 36. The forward portion 33 of the vehicle body 25 means the portion proximal to the cab 23 of the vehicle 20. The rearward portion 34 of the vehicle body 25 means the portion distal from the cab 23 of the vehicle 20.

Figure 3:
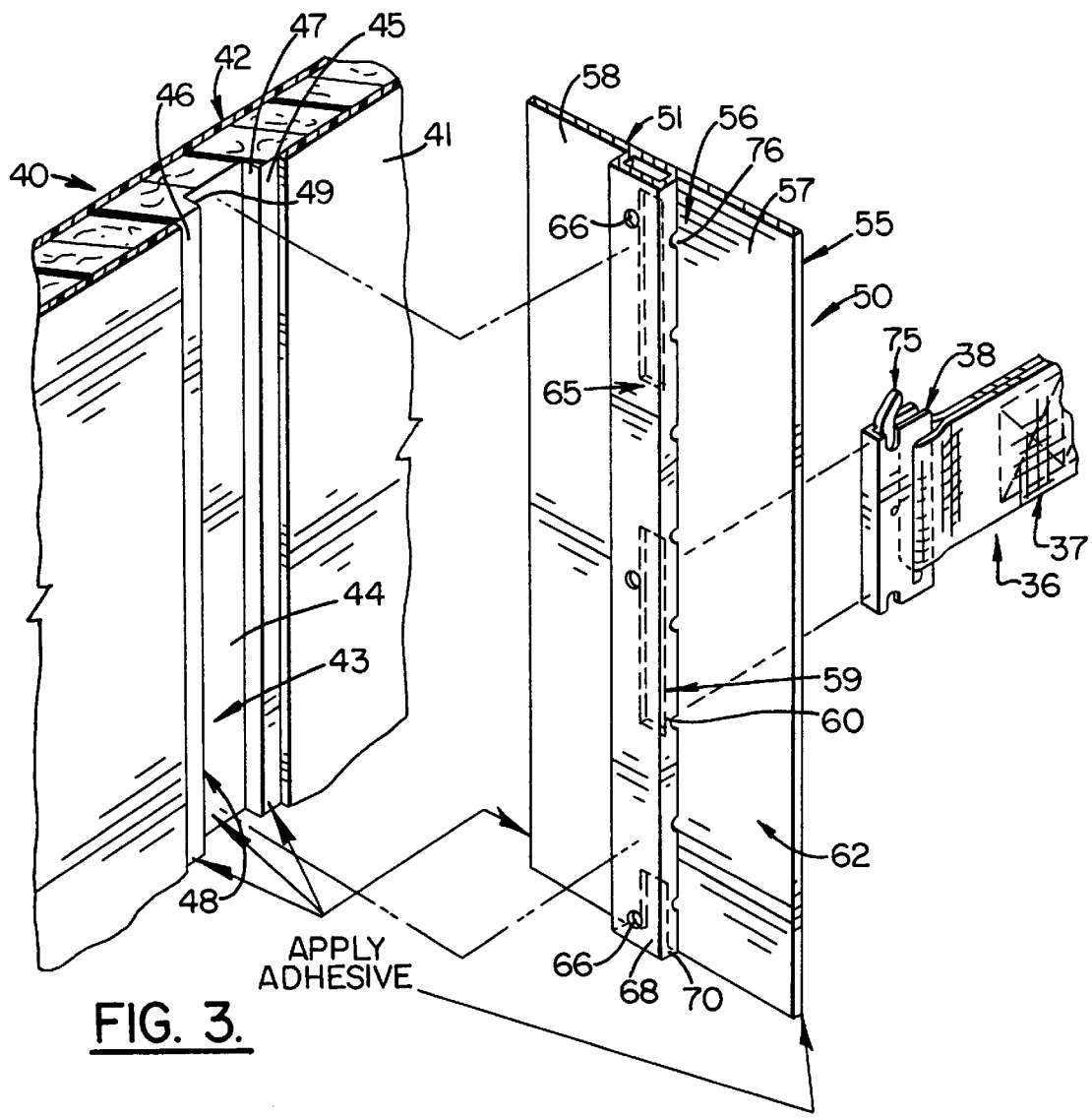
FIG. 3 is an exploded view of the anchoring system of FIG. 2.

Referring now to FIGS. 1–3, an anchoring system 35 is described in more detail as follows. In the anchoring system 35, the panel 40 has an inner surface 41 positioned in the cargo carrying cavity 32 and an outer surface 42 forming a portion of the exterior of the truck 20. The panel 40 has a channel 43 recessed within the inner surface 41 (FIG. 3). The channel 43 can be formed in the panel 40 by routing or by other methods known to those of ordinary skill in this art.

Referring to FIG. 3, the channel 43 includes a trough portion 44 and lateral lip portions 45, 46 on the opposite sides thereof. The trough portion 44 and the lip portions 45, 46 extend generally along the longitudinal length of the trough portion 44 of each sidewall 27, 28 of the vehicle body 25. Channels of various configurations can be provided to be utilized with tracking plates. Such channels 43 are preferably about three-eights (3/8) of an inch deep and can be formed at various times including prior to construction of the vehicle body 25 or after the vehicle body 25 is already assembled.

Referring again to FIGS. 1–3, a plurality of tracking plates 50, 50' of the anchoring system 35 are depicted. Each tracking plate 50 includes a face member 55 having a center portion 56 and lateral portions 57, 58 on opposite sides of the center portion 56 (FIG. 3). The face members 55, as depicted in FIG. 1, extend longitudinally along the sidewalls 27, 28. The tracking plate 50, including the face member 55, is formed from galvanized steel and black steel. Various other materials, including other steels, metals, polymers and composite materials can be utilized in forming the tracking plate 50.

Figure 4:
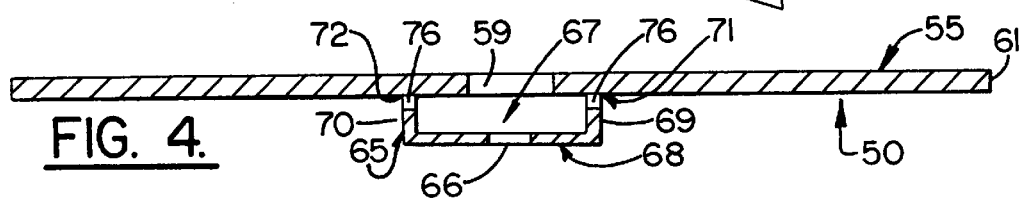
FIG. 4 is a cross-sectional view of the tracking plate of the anchoring system of FIG. 3.

Referring to FIGS. 2–4, the plurality of apertures 59 has a rectangular shape. The apertures 59 are positioned in the center portion 56 of the face member 55, and have longer sides 60 oriented parallel to the longitudinal axis of the face member 55 (FIG. 3). Referring to FIG. 4, the apertures 59 extend through the thickness 61 from the front side 63 to the rear side 62 of the face member 55.

Referring to FIGS. 3–4, the tracking plate 50 also has a spine member 65 connected with a rear side 62 of the face member 55 (FIG. 3). A portion of the spine member 65 is spaced apart from the face member 55 defining a cavity 67 of rectangular cross-section (FIG. 4). The spine member 65 and face member 55 are spaced apart between about one-eighth and one inch. Various other configurations of the spine member 65, face member 55, and cavity 67 can be formed for use with a variety of cargo restraint mechanisms. The spine member 65 includes a bottom 68 and leg portions 69, 70 on opposite sides of the bottom (FIG. 4). The leg portions 69, 70 are positioned between the bottom 68 and the face member 55. The spine member 65 also extends longitudinally along the center portion 56 of the face member 55. The apertures 59 on the face member 55 are aligned with the spine member 65 such that the apertures 59 provide access from the front side 63 of the face member 55 into the cavity 67 formed between the spine member 65 and the face member 55 (FIG. 5).

Figure 5:
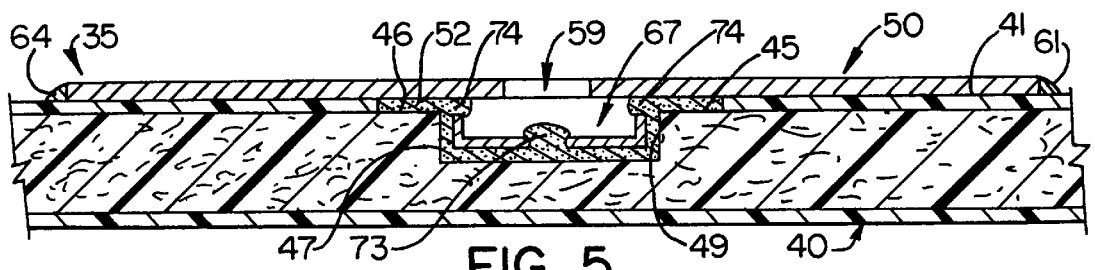
FIG. 5 is a section view of the anchoring system taken along line 5—5 of FIG. 2.

Referring still to FIGS. 3–5, the spine member 65 also includes, preferably, a plurality of holes 66 positioned along the bottom portion 68 of the spine member 65. The spine member 65 and the face member 55 are connected forming intersections 71, 72 between each of the side legs 69, 70 and the rear surface 62 of the face member 55 (FIG. 3). A plurality of holes 76 are positioned along each of the intersections 71, 72. These holes 66, 76 are positioned along the extent of the bottom 68 of the spine member 65 and the intersections 71, 72 of the spine member 65 and face member 55 as shown in FIG. 3.

Referring now to FIG. 4, a cross section of the face member 55 is illustrated. The lateral portions 57, 58 face member 55 extend laterally on opposite sides of the spine member 65. The spine member 65 has a C-shaped cross-section formed by the side legs 69, 70 and the bottom portion 68. The cavity 67 is visible from an end portion 51 of the tracking plate 50 between the face member 55 and the spine member 65. Further, as depicted in FIG. 4, the alignment of the apertures 59 with the spine member 65 is so as to provide access into the cavity 67. Various other shapes and configurations of cavities and apertures can be provided to receive and accommodate different type of cargo or personnel anchoring mechanisms. For example, a cavity configured to receive straps, other buckles, clips, carabineers or the like can be provided in the tracking plate.

With reference to FIGS. 3 and 5, the spine member 65 is positioned in and connected with the channel 43 of the panel 40. The tracking plate 50 is inserted in the channel 43 with the spine member 65 positioned in the channel 43 such that the side legs 69, 70 of the spine member 65 contact the side walls 47, 49 of the channel 43 and the bottom portion 68 of the spine member 65 co-extensively overlies the trough portion 44 of the channel 43 of the panel 40. The rear side 62 of the face member 55 extends beyond the channel 43 on each side and generally co-extensively overlies the inner surface 41 of the panel 40.

As shown in FIG. 5, the face member 55 is connected with the panel 40 by an adhesive 52 or other bonding means. The adhesive 52 can be applied to various portions of the anchoring system 35 to adhere the tracking plate 50 with the panel 40. For example, adhesive 52 can be applied to the panel 40 in the channel 43, lip portions 45, 46 and inner surface 41 and/or to the tracking plate on the rear surface 62 including the spine member 65 and the face member 55. Such adhesive 52 can be preferably applied between the lateral portions 57, 58 of the face member 55 and the inner surface 41 of the sidewall 27, 28 to adhere the face member 55 with the inner surface 41. Further, the bottom portion 68 of the spine and the channel 43 of the panel 40 can be adhered with adhesive 52. The lip portions 45, 46 of the channel 43 can also be adhered to the tracking plate 50. As shown in FIG. 5, an epoxy 52 sold under the mark Sikaflex® by Sika Corporation of Des Plaines, Ill. is applied to adhere the tracking plate 50 to the panel 40. Other adhesives, bonding agents and bonding means can be utilized to connect the face member 55 with the panel 40. As such adhesives, bonding agents and bonding means are known to one of ordinary skill in the art, the details of such are not described herein.

When the adhesive 52 is applied in the channel 43 and the spine member 65 of the tracking plate 50 is positioned therein, the adhesive 52 can enter the plurality of holes 66 in the bottom portion 68 of the spine member 65. When this occurs, adhesive rivets or finger rivets 73 (shown in FIG. 5), are formed, thereby providing additional strength to the bonding of the tracking plate 50 and the panel 40. Further, the adhesive 52 can likewise enter through the holes 76 in the intersections 71, 72 between the face member 55 and the spine member 65 to form additional adhesive rivets 74. The adhesive rivets, 73, 74 provide additional strength in bonding the tracking plate 50 and the panel 40 thereby providing strength against various forces and stresses. Thus, adhesive bonding is strengthened by these rivets 73, 74 in at least two directions.

As illustrated in FIG. 5, the face member 55 of the anchoring system 35, when bonded with the panel 40, extends laterally beyond the channel 43. The face member 55 and spine member 65 together assist in the alignment of the anchoring system 35 and strengthening of the panel 40 having the tracking plate 50 connected therewith. The anchoring system 35 acts as a strength increasing splint for the entire panel 40 of the vehicle body 25. The spine member 65 retains a cargo anchoring mechanism 36 secured into the tracking plate 50 by its receipt within the cavity 67. If the face member 55 is moved laterally with respect to the channel 40, the spine member 65 is retained by the sides 47, 48 of the channel 40. The lateral extension of the face member 55 also can provide stability to retain the face member 55 in position.

As illustrated in FIG. 5, the edges 64 of the lateral portions 57, 58 of the face member 55 extend a distance approximately equal to the thickness 61 of the face member 55, from the inner surface 41 of the panel 40, preferably only about one-eighth of an inch. Also, with the face member 55 attached to the panel 40 in this manner, a portion of the cavity 67 is contained within the channel 40. As the anchoring system 35 of the present invention is secured without requiring drilling through the thickness of the panel 40, or inserting mechanical fasteners through the panel 40, heat loss can be reduced and a water seepage caused by drilling through the panels 40 in prior systems can be eliminated.

Referring now to FIGS. 2 and 3, with the tracking plate 50 connected in the panel 40 of the sidewall 27, 28, a cargo restraint mechanism 36 is inserted in an aperture 59. The buckle 38 can be connected by inserting the buckle into an aperture 59 (FIGS. 2 and 3). A retractable finger 75 holds the buckle 38 within the cavity 67 of the tracking plate 50. Such buckles 29, 38 are designed to be utilized in an upright or vertical position (FIG. 2). The buckles 39, 38 and strap 37 of the cargo restraint mechanism 36 illustrated in FIG. 2 are manufactured by various manufacturers, for example, Kinedyne of Newark, N.J., and are known to one of ordinary skill in the art. Thus, the details of this and other known cargo restraint mechanisms which can be utilized with the anchoring system are not described in detail herein.

The rectangular apertures 59 are positioned having their longer sides 60 extending parallel to the longitudinal axis of the face member 50 such that the buckles 39, 38 can be attached in a vertical orientation (FIGS. 2 and 3). The buckles 39, 38 each enter a cavity 67 and are connected within the cavity 67 below the inner surface 41 of the panel 40. As depicted in FIG. 2, the tracking plate 50 is connected in the panel 40 with the lateral portions 57, 58 of the face member 55 generally overlying respective sidewall 27, 28 and only extending into the cavity carrying space 32 a distance approximately equal to the thickness of the face member 55. The anchoring system 35 thereby increases the available volume of the cargo carrying cavity 32 in comparison to prior anchoring systems as described herein. Further, as the tracking plate 50 generally extends only about one-eighth of an inch from the 25 inner surface 41 of the panel 40 of the anchoring systems 35, the anchoring system 35 eliminates the need for a scuff plate of prior systems and allows for the positioning of tracking plates 50 along the vertical extent of the sidewalls 27, 28 from the floor 29 to the roof 26 of the vehicle body 25.

As the cargo C depicted in FIG. 1 occupies only the forward portion 33 of the cargo carrying space 32 of the truck body 25, the cargo restraint mechanism 36 is positioned in the tracking plates 50, 50' at a position rearward of the cargo C. The anchoring system 35 thereby provides flexibility in accommodating various cargos. The anchoring system 35 of the present invention increases available cargo carrying space 32 and reduces the cost and materials required in constructing a vehicle body 25.

The anchoring systems 35 also can be utilized in vehicle bodies made of varying panels, including wood, and other composite panels, which have a thickness sufficient for forming a channel 43 to receive a tracking plate 50. Such panels can be utilized in providing various vehicle bodies, including truck bodies, motor homes, house, horse and cattle trailers and other vehicle bodies which require internal anchoring and tracking in support of cargo or personnel. Other vehicles which can utilize the anchoring systems according to the present invention include hospital trucks, refrigerator trucks, furniture trucks, emergency vehicles and ambulances, and other vehicles which have unique needs of carrying heavy cargo, delicate cargo, or the need for a controlled environment, such as refrigeration or heat. These vehicles can be provided with various configurations of anchoring systems configured to perform different functions. For example, hospital trucks can be provided having connections for heavy equipment. Further, animals or other living beings could be stabilized or retained in place by anchoring systems according to the present invention.

The present system allows for customizing of the anchoring systems 35 for individual truck bodies. The channels 40 can be mounted at varying locations in any portion of the vehicle body 25 formed of a panel 40. Therefore, the anchoring system 35 can be utilized in the sidewalls 27, 28, front walls 24, the floor 29, or even the roof 26 of the vehicle body 25. If the rear doors 30, 31 are formed of an FRP panel material or a like panel material, the rear doors 30, 31 can also accommodate an anchoring system 35. Thus, the anchoring systems 35 of the present invention also increases the flexibility of positioning of cargo anchoring restraint 36 within a cargo carrying space 32.

Also, the tracking plate 50 can be anchored to the panels of any of the walls at various stages of construction of the vehicle body 25. For example, the tracking plates 50 can be connected with the panel 40 prior to construction of the vehicle body 25, during construction of the vehicle body 25, or after construction thereof. Further, additional tracking plates 50 can be mounted to the panels 50 at a later time. Tracking plates can be configured in various lengths and sizes and can be positioned in the vehicle body at any angle or spacing desired.

Figure 6:
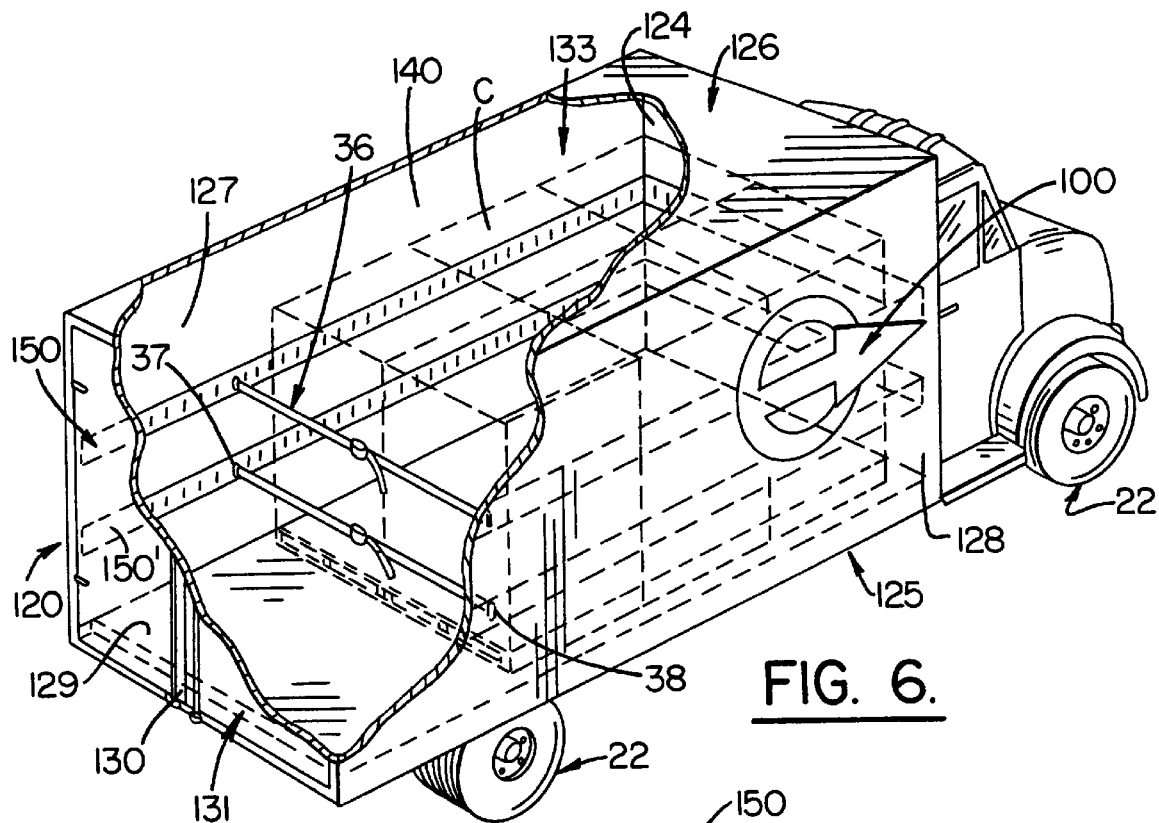
FIG. 6 is a cutaway perspective view of an alternative embodiment of a truck having an anchoring system according to the present invention.
Figure 7:
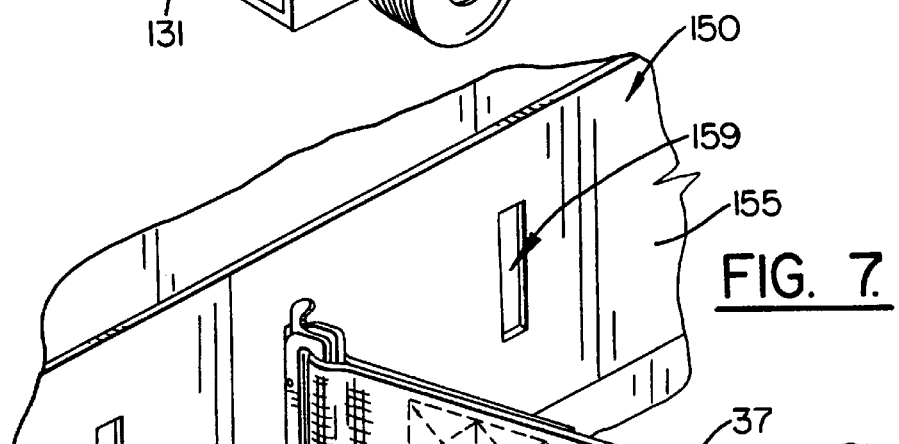
FIG. 7 is a detailed view of the anchoring system of FIG. 6 having a cargo restraint mechanism connected therein.
Figure 8:
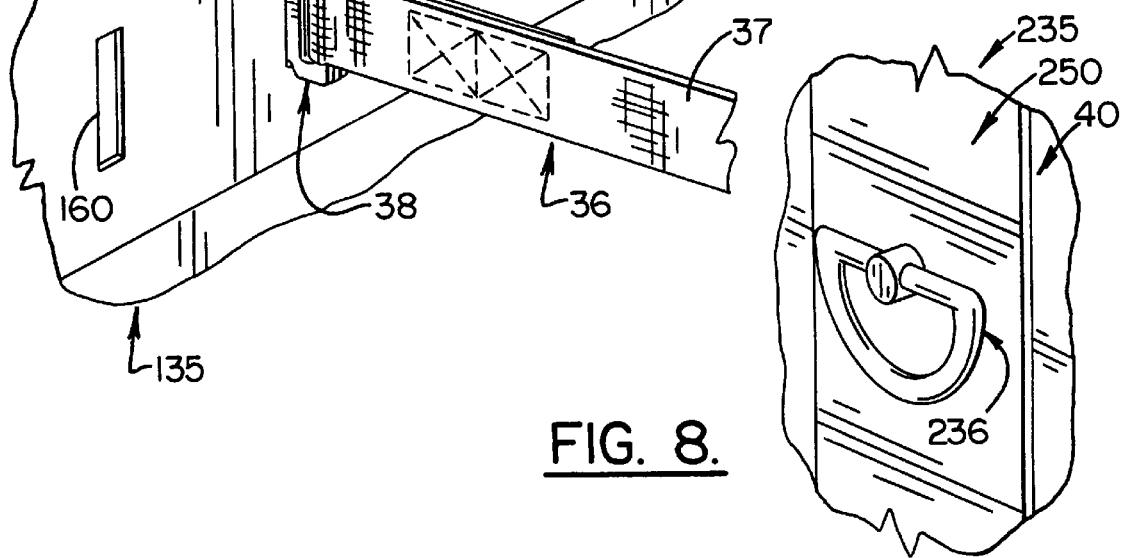
FIG. 8 is a view of a alternative embodiment of an anchoring system including a D-ring for securing cargo connected therein.

Referring now to FIGS. 6–8, an alternative embodiment of the anchoring system 135 for a vehicle body 125 is described with respect to a truck having elements described in FIG. 1, as shown. The vehicle body 125 includes sidewalls 127, 128, a roof 126, a floor 129, front wall 124, and rear doors 130, 131, as generally described with respect to FIG. 1. Referring to FIGS. 6 and 7, each of the sidewalls 127, 128 are formed of an FRP panel as described herein. A tracking plate 150 is provided having a face member 155 and a spine member similar to those described with respect to tracking plate 50. However, the tracking plate is connected with the panel 127, 128 in a channel of the panel 127, 128 which extends laterally or horizontally along the sidewall 127, 128 with respect to the floor 129 of the truck 120.

Each sidewall includes two tracking plates 150, positioned at a height of approximately 24 inches from the floor 129 and 48 inches from the floor 129 (FIG. 6). As with the embodiments of FIGS. 1–5 these tracking plates 150 can be connected at various heights or locations throughout the interior of the truck body 125. The tracking plates 150 have rectangular shaped apertures 159 positioned with the longer sides 160 in a vertical orientation in the truck body 125. The apertures 159 are positioned having the longer sides 160 normal to the elongated directions of the face member 155.

Referring to FIGS. 6 and 7, the buckles 38, 39 of the cargo restraint mechanism 36 are attached in a vertical orientation with respect to the floor of the truck 120 in the apertures 159 such that the strap 37 and buckles 38, 39 restrain the cargo C in a predetermined forward position 133. The tracking plates 150, 150' are connected with the panels 140 as previously described.

The anchoring systems 35, 135 of the present invention, as depicted in FIGS. 1–5 and 6–8, also contain an outer surface 42 of the panels 140 of the truck body 125 which is not marred by fasteners or bolts. As the anchoring system 35, 135 is secured without drilling through the entire width of the panel, the outer surface of the panel 140 is generally smooth. Thus, indicia or advertising 100 can be more effectively displayed on the outer surface 140 of the vehicle body 125 as shown in FIG. 6.

Referring to FIG. 8, another embodiment of an cargo anchoring system 235 is illustrated. The tracking plate 250 as described herein is positioned in a panel 40. However, instead of apertures, the tracking plate has a D-ring 236 inserted within a circular hole in the tracking plate 250. The D-ring 236 can be utilized with other cargo restraints including straps or the like. Various other types of apertures or connecting means can be utilized with the tracking plate of the present invention. Therefore, various types and sizes of channels or tracking plates, including face members and spines, can be also utilized in the present invention. Further, tracking plates which do not require a cavity can be utilized and adhered in like manner with a panel of the vehicle body.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed:

1. An anchoring system comprising:

a panel having a surface and a channel recessed from said surface; and, a tracking plate having a spine member connected with said panel in said channel and receiving means for receiving a cargo anchoring mechanism, wherein said tracking plate includes a plurality of holes positioned in a bottom portion of said spine member and said spine member is connected with said panel by adhesive rivets in said holes.

2. An anchoring system comprising:

a panel having a surface and a channel recessed from said surface; and a tracking plate having a face member and a spine member connected with said panel in said channel and receiving means for receiving a cargo anchoring mechanism, wherein said spine member and said face member are connected forming an intersection, and wherein a plurality of holes are positioned along said intersection of said spine member and said face member, and said tracking plate is connected with said panel by adhesive rivets in said holes.

* * * * *